United States Patent [19]

Shaw

[11] Patent Number: 4,887,507
[45] Date of Patent: Dec. 19, 1989

[54] MUSIC TEACHING DEVICE

[76] Inventor: Terrance Shaw, 4032 N. Whitman, Tacoma, Wash. 98407

[21] Appl. No.: 265,036

[22] Filed: Oct. 31, 1988

[51] Int. Cl.$^4$ .............................................. G09B 15/02
[52] U.S. Cl. ........................................................ 84/474
[58] Field of Search .................... 84/471 SR, 474, 473

[56] References Cited

U.S. PATENT DOCUMENTS

| | | | |
|---|---|---|---|
| 554,172 | 2/1896 | Meules | 84/473 |
| 3,884,114 | 5/1975 | Leonard | 84/471 |
| 3,884,115 | 5/1975 | Leonard | 84/471 |
| 4,037,518 | 7/1977 | Lorenzen | 84/474 |
| 4,069,735 | 1/1978 | Bertram | 84/474 |
| 4,552,052 | 11/1985 | Lee | 84/473 |
| 4,716,806 | 1/1988 | Forrest | 84/474 |

FOREIGN PATENT DOCUMENTS 334 of 1874 United Kingdom .................. 84/474

OTHER PUBLICATIONS

Publication entitled, "Keywheel;" by Terry Shaw, of Music Potential, Tacoma, Washington, 1988.

*Primary Examiner*—L. T. Hix
*Assistant Examiner*—Brian W. Brown
*Attorney, Agent, or Firm*—Glenn D. Bellamy

[57] ABSTRACT

This invention is a music theory teaching aid which structurally includes a base member, a main wheel member pivotally attached to the base member at a central location, and twelve secondary wheel members each pivotally attached to the base member at circumferentially spaced-apart points, radially outwardly from the main wheel member. The base member bears indicia indicating major scale reference notes for each of the twelve musical keys. Each reference note is associated with one of the secondary wheel members. The main wheel member is pivotable to selectively align indicia thereon to correspond with major reference notes on the base member such that the order of diatonic notes of a selected key are indicated for each mode of the selected key. Indicia on each secondary wheel member radially divides it into twelve equal sections representing chromatic steps of an octave. Also indicated on each secondary wheel member are the diatonic notes of a separate one of the twelve keys, arranged in order at whole- and half-step intervals in associating with the radial divisions. Each secondary wheel member is pivotable to selectively associate the tonic note of each mode of the secondary wheel member's separate key with the association reference note on the base member. Each of the secondary wheel members may indicate major third and minor third intervals between the diatonic notes of the key and may also indicate roots of major, minor, and diminished triads in that key. Such indications may be differentiated by color.

17 Claims, 6 Drawing Sheets

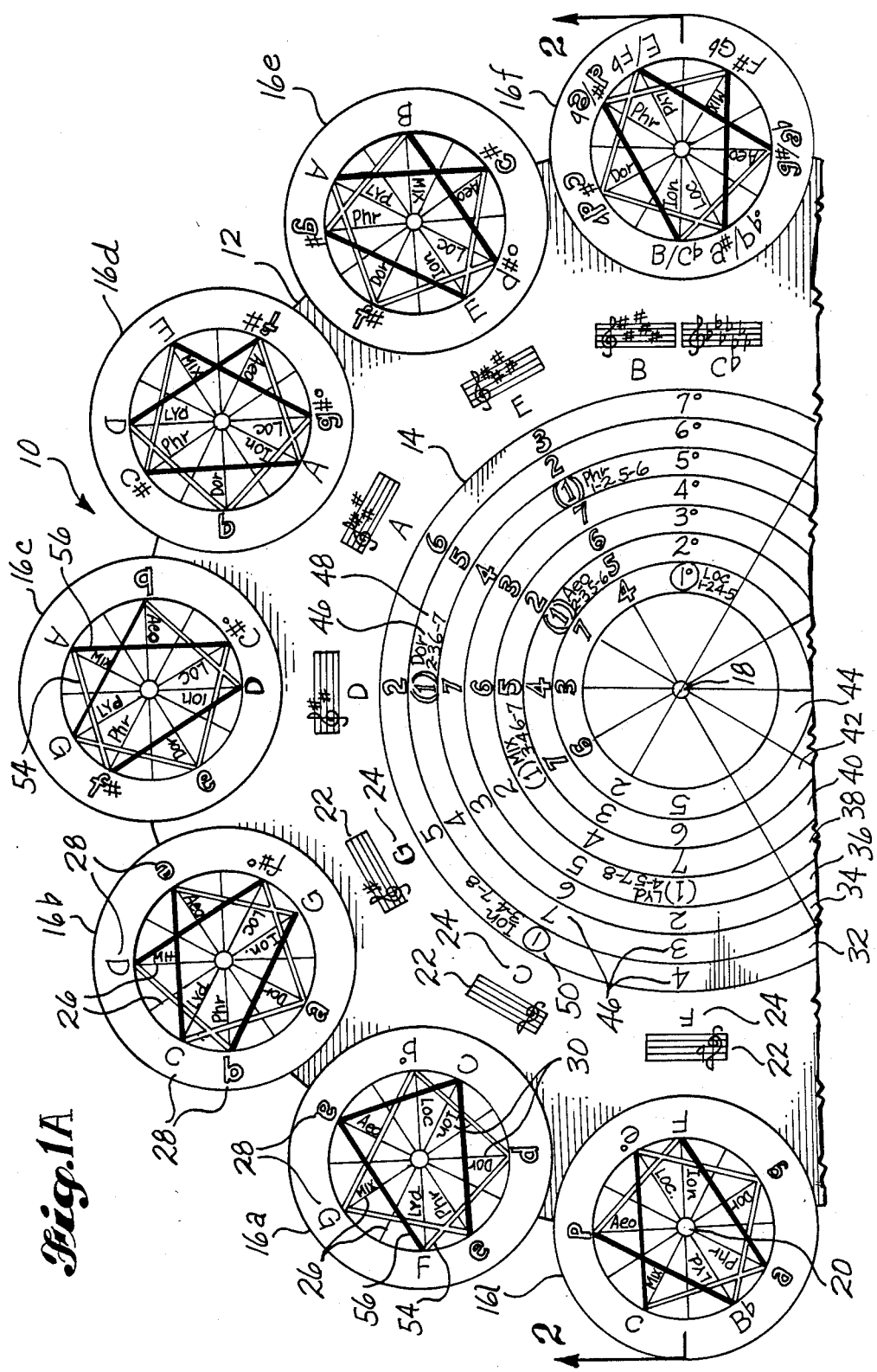

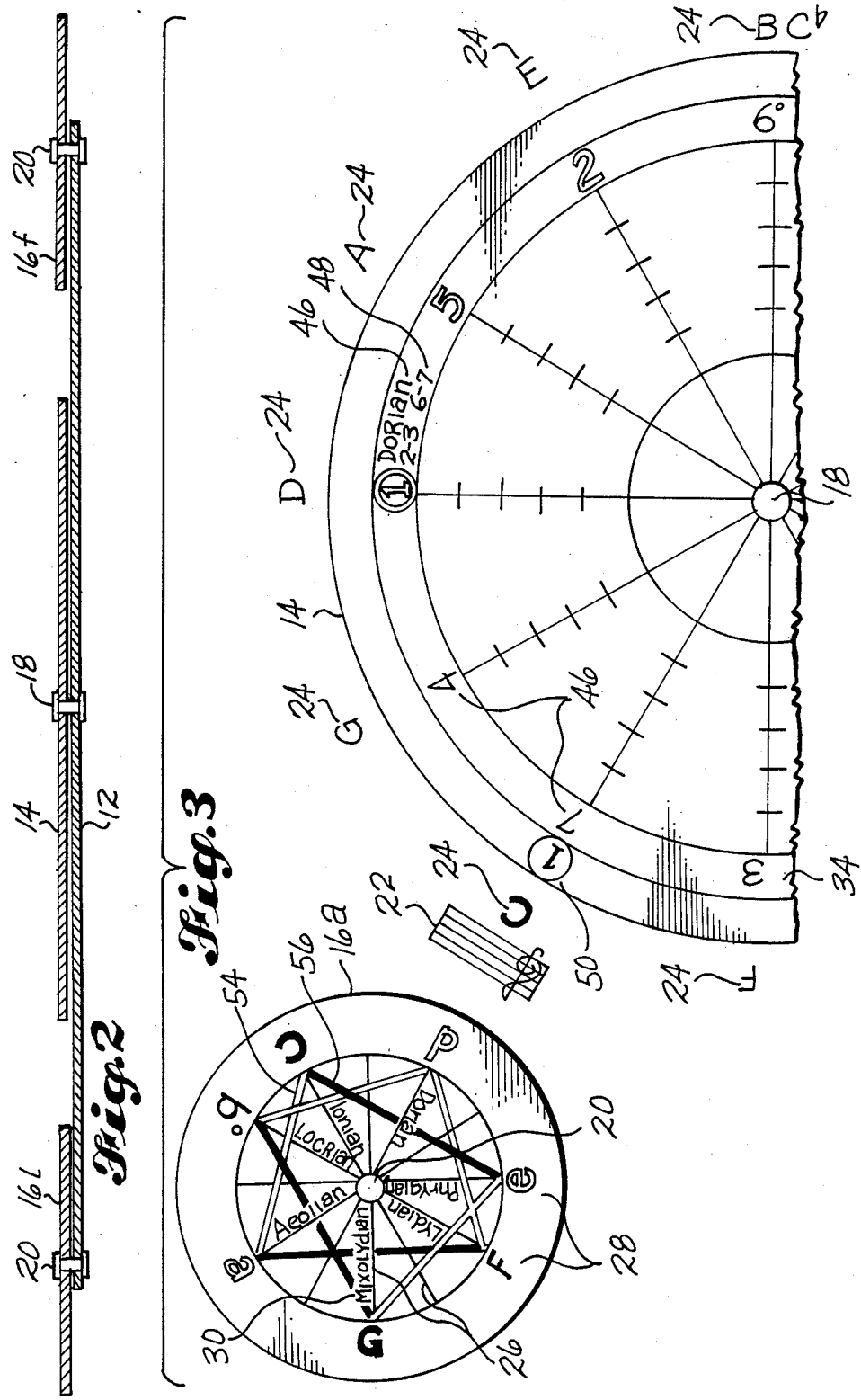

MUSIC TEACHING DEVICE

TECHNICAL FIELD

This invention relates to a device for teaching music theory, including the construction of a key, triad structure, the seven modes, harmony and the seven modal triad progressions.

BACKGROUND ART

The teaching of music theory has often been accompanied by instruction on a keyboard instrument, such as a piano. Keyboard instruction provides the student with a means for visualizing the arrangement and relationship of notes and scales which would otherwise not be provided by the isolated study of music on other instruments.

Visual teaching aids have been developed to replace keyboard instruction. However, prior devices have been an inadequate substitute in providing a complete means for visualizing the order and relationship of every key and every triad or chord contained therein, as perceived from every mode.

DISCLOSURE OF THE INVENTION

The present invention provides a music teaching device which includes a base member having an upper surface, a main wheel member pivotally attached to the upper surface of the base member at a central location, and twelve secondary wheel members, each pivotally attached to the upper surface of the base member at circumferentially spaced-apart points radially outwardly from the main wheel member. Indicia is provided on the base member indicating major scale reference notes for each of twelve keys and are circumferentially spaced around the main wheel member. A major scale reference note is associated with each of the secondary wheel members. The main wheel member may be pivoted to selectively align indicia on the main wheel member to correspond with the major scale reference notes on the base member such that the diatonic order of notes of a selected key are indicated for each mode of the selected key.

The secondary wheel members bear indicia which radially divide each secondary wheel member into twelve equal sections. Each of these sections represents a chromatic step of an octave. Each of the secondary wheel members also bear indicia indicating the diatonic notes of a separate one of the twelve keys. The diatonic notes are arranged in order at whole- and half-step intervals in association with the radial divisions. Each of the secondary wheel members may be pivoted to selectively associate the tonic note of each mode of the key indicated on that wheel with the associated major scale reference note or key signature on the base member.

According to another aspect of the invention, the secondary wheel members may include indicia indicating major third and minor third intervals between the indicated diatonic notes of a scale. The major third and minor third intervals may be differentiated by indicia of a separate selected color. The secondary wheels may also indicate, such as by color, the diatonic notes which are roots of major, minor and diminished triads in the key which is represented by that particular secondary wheel member. The name of each of the seven modes may be indicated on each secondary wheel member and associated with the tonic note of that mode.

According to still another aspect of the invention, the main wheel member may include indicia in the form of numerals arranged in concentric lines, each line separately indicating the numerical order of corresponding major scale reference notes for a mode of the selected key. The tonic note of each mode in that key may be also indicated. According to an aspect of the invention, the roots of major, minor, and diminished triads for each mode of a selected key are separately indicated, such as by color.

According to yet another aspect of the invention, the base member may include indicia indicating key signatures associated with each of the major scale reference notes. All fifteen key signatures and major scale reference notes for the twelve keys may be included such that there are three enharmonic keys having two key signatures and two major scale reference notes. The key signatures and major scale reference notes may be arranged in order of intervals of ascending major fifths and descending major fourths beginning from the key of no sharps and no flats (major scale reference note C). This arrangement is commonly referred to as the "circle of fifths" or "circle of fourths".

BRIEF DESCRIPTION OF THE DRAWINGS

Like reference numerals are used to represent like parts throughout the various figures of the drawing, and FIGS. 1a and 1b are fragmentary top views of a music teaching device constructed according to the preferred embodiment of the invention and showing an example configuration thereof;

FIG. 2 is a cross-sectional view taken substantially along line 2—2 of FIG. 1;

FIG. 3 is a fragmentary view showing a second example configuration of the device;

BEST MODE FOR CARRYING OUT THE INVENTION

Figure 1B:
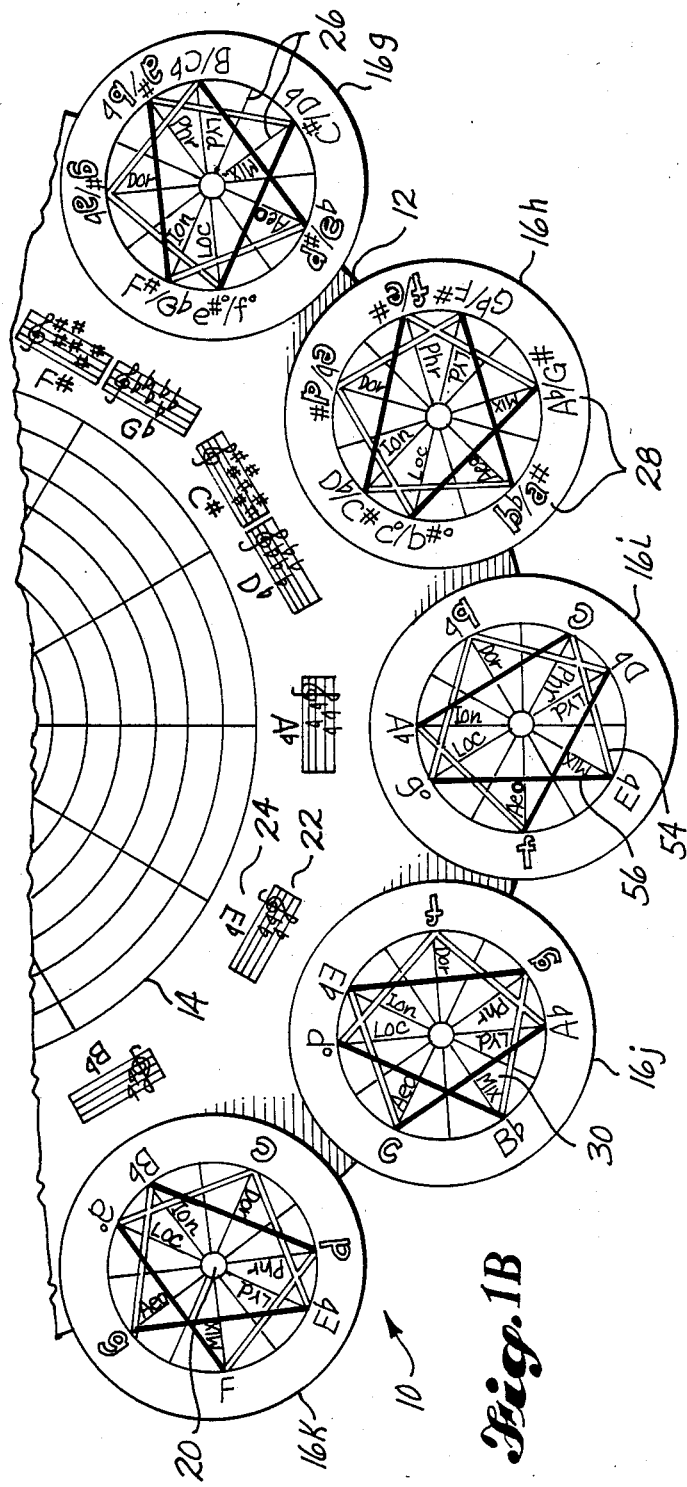

The device of the present invention is a music teaching aid which provides visual explanations for many musical concepts based on the diatonic (seven-note) scale. Shown in FIGS. 1a and 1b is a top plan view of the preferred embodiment of the invention. The device 10 includes a base member 12, a main or "transposing" wheel member 14, and twelve secondary wheel members 16a–l. In preferred form, each of these members 12, 14, 16 are made of a durable paper or plastic material having a surface which readily accepts printing. As shown in FIG. 2, the main wheel member 14 is pivotally attached to the upper surface of the base member 12 at a central location. This attachment may be by means of a metal rivet 18 or other equivalent means which provides a rotating attachment of the main wheel member 14 on the base member 12. Each of the twelve secondary wheel members 16 are pivotally attached to the base member 12 at circumferentially spaced-apart locations, radially outwardly from the main wheel member 14. The attachment of each secondary wheel member may also be by means of a rivet 20 or other equivalent means.

The main wheel member 14 and each of the twelve secondary wheel members 16 may be pivoted to align indicia printed thereon with indicia printed on the base member 12. The relationship of the printed indicia with the structural orientation of the members 12, 14, 16 provides information regarding the relationship of musical notes, scales and chords in each key.

Virtually all music of the western world is built upon twelve diatonic (seven-note) keys. The key signature 22 and major scale reference note 24 for each of the indicated keys is printed on the base member 12 in an arrangement which is commonly known as the "circle of fifths" or "circle of fourths". In preferred form, the key signatures 22 and major scale reference notes 24 are arranged beginning from the key of no sharps and no flats (reference note C) clockwise by ascending intervals of fifths. A sharp is added to each key until all seven notes are sharped (reference note C sharp). The order of sharps can be seen in each new key signature 22 printed on the base member 12. Starting at the key of no sharps and no flats (reference note C) and moving counterclockwise by descending intervals of fourths, a flat is added to each key signature 22 until all seven notes are flatted (reference note C flat). The order of flats can be seen on each key signature 22 printed on the base member 12. This process yields fifteen key signatures 22 and fifteen major scale reference notes 24, although in reality there are only twelve keys. An overlap is created on the keys of five sharps (B) and seven flats (C flat), the keys of six sharps (F sharp) and six flats (G flat), and the keys of seven sharps (C sharp) and five flats (D flat). These three pairs of keys are known as enharmonics, as each pair is built upon the same pitch.

Each secondary wheel member 16 is divided by radial lines 26 into twelve equal sections. An octave may be visualized as being made of twelve equal sections or twelve half steps. Each radial line 26 represents a half step in an octave. Playing each half step in an octave would create a chromatic or "half-step" scale.

Each key is constructed in an exact manner and will contain seven notes, seven modes and seven triads. These three musical elements are depicted for each key on a separate one of each of the secondary wheel members 16. Each of the seven naturally-occurring (diatonic) notes 28 in a separate key are printed around the perimeter of each secondary wheel member 16. Each of the seven notes 28 is assigned to its position on the secondary wheel member 16 according to appropriate whole- and half-step intervals as represented by the radial lines 26. Notes that would occur between the whole steps are called "accidentals." Accidentals have spaces reserved on each secondary wheel member 16, but are not listed because they do not naturally occur in the key. Each key has five accidentals and, therefore, five spaces are left blank on each secondary wheel member 16.

For example, on the secondary wheel member 16a representing the key of no sharps and no flats (reference note C) the notes are A, B, C, D, E, F, and G. These notes 28 are printed in a cyclic manner around the perimeter of the secondary wheel member 16a. Half steps and whole steps are clearly seen by the arrangement of the notes 28. Moving clockwise around the secondary wheel member 16a, it is readily apparent that in the key of no sharps and no flats, the half steps occur between B-C and E-F, as shown by the shorter distances between the notes 28. Every diatonic key contains two half steps and five whole steps.

Each key may be perceived from any of seven different modes or "moods". The seven modes of each key are Ionian, Dorian, Phrygian, Lydian, Mixolydian, Aeolian, and Locrian. A mode may be viewed as starting on each note in a key and playing every note in order for one octave. For example, in the key of no sharps and no flats (secondary wheel member 16a), starting on C and playing clockwise around the circle (C-D-E-F-G-A-B-C) creates a C Ionian mode, or C major scale. The name of each mode 30 is printed on each secondary wheel member 16 in association with the note 28 and radial line 26 which is associated with the "tonic" or first note of the mode of the particular key. For example, on secondary wheel member 16a, the word "Ionian" is associated with the radial line 28 which corresponds to the note "C." Within the same key, starting at D and playing each note 28 clockwise around the perimeter of the secondary wheel member 16a (D-E-F-G-A-B-C-D), creates a D Dorian mode. The word 30 "Dorian" is printed in association with the radial line 26 which corresponds to the note "D." D is the tonic note of the Dorian mode in the key of no sharps and no flats.

Modes are defined by where the half steps occur numerically in the order of the diatonic notes. This concept may be visualize on each of the secondary wheel members 16 for each key by counting clockwise around the perimeter of the secondary wheel member 16 beginning from the tonic note of a selected mode. Each mode name 30 is associated with the tonic note 28 of that mode of that key. The numerical relationship of the notes of each mode of each key are also represented on the main or "transposing" wheel member 14. A separate cocentric line 32, 34, 36, 38, 40, 42, 44 is associated with each mode Each of these rows contain seven numerals 46 arranged in radial columns so that they may be selectively associated with the key signatures 22 and major scale reference notes 24 on the base member 12. Each row contains the numerals 1 through 7 and represents the numerical order of major scale reference notes 24 for a given mode in the selected key. For example, as shown in FIG. 1a, the outermost row 32 of numerals indicates that the order of major scale reference notes 24 for the Ionian mode is 1-C, 2-D, 3-E, 4-F, 5-G, -A, and 7-B. Each row contains the name 46 of the mode, the numerical order of which is indicated by that row. For easy reference, the tonic note for each mode (numeral 1) may be circled or otherwise denoted. Each row may also indicate the numerical interval between which half-steps are found, as shown at 48.

For example, the Ionian tonic note 50 on the main wheel member 14 may be aligned with the key signature 22 of no sharps and no flats (reference note C), as shown in FIG. 1a. The indicia on the main wheel member 14 will be lined up with the proper major scale reference notes 24 on the "circle of fifths" printed on the base member 12. Observing from left to right on the outermost concentric line 32, F is 4, C is 1, G is 5, D is 2, A is 6, E is 3, and B is 7. This information may also be created mentally by counting clockwise around the secondary wheel member 16a which is associated with the same key signature 22. The placement of the half steps in the C Ionian mode may be observed to be between 3—4 (E—F) and 7—8 (B—C).

Referring now to FIG. 3, the Dorian mode of the same key may be examined. FIG. 3 shows that the secondary wheel member 16a has been rotated one whole step to align D with the key signature 22 of no sharps and no flats. The numerical data for the Dorian mode is located on the second cocentric line 34 on the main wheel member 14. Observing from left to right, F is 3, C is 7, G is 4, D is 1, A is 5, E is 2, and B is 6. This information may also be created mentally by counting clockwise from D on the secondary wheel member 16a. Half steps in the D Dorian mode are between 2—3 (E—F) and 6—7 (B—C), as depicted on the secondary wheel member 16a and second cocentric line 34 of the main wheel member 14, as at 48. Each of the seven modes in every key may be studied in this manner by adjusting the tonic or first numeral of the Ionian mode 50 to a selected key signature 22 or major scale reference note 24 on the base member 12. At any selected position, each cocentric line on the main wheel member 14 will indicate the numerical order of the major scale reference notes 24 which are aligned radially outwardly from the numerals 46.

Figure 4:
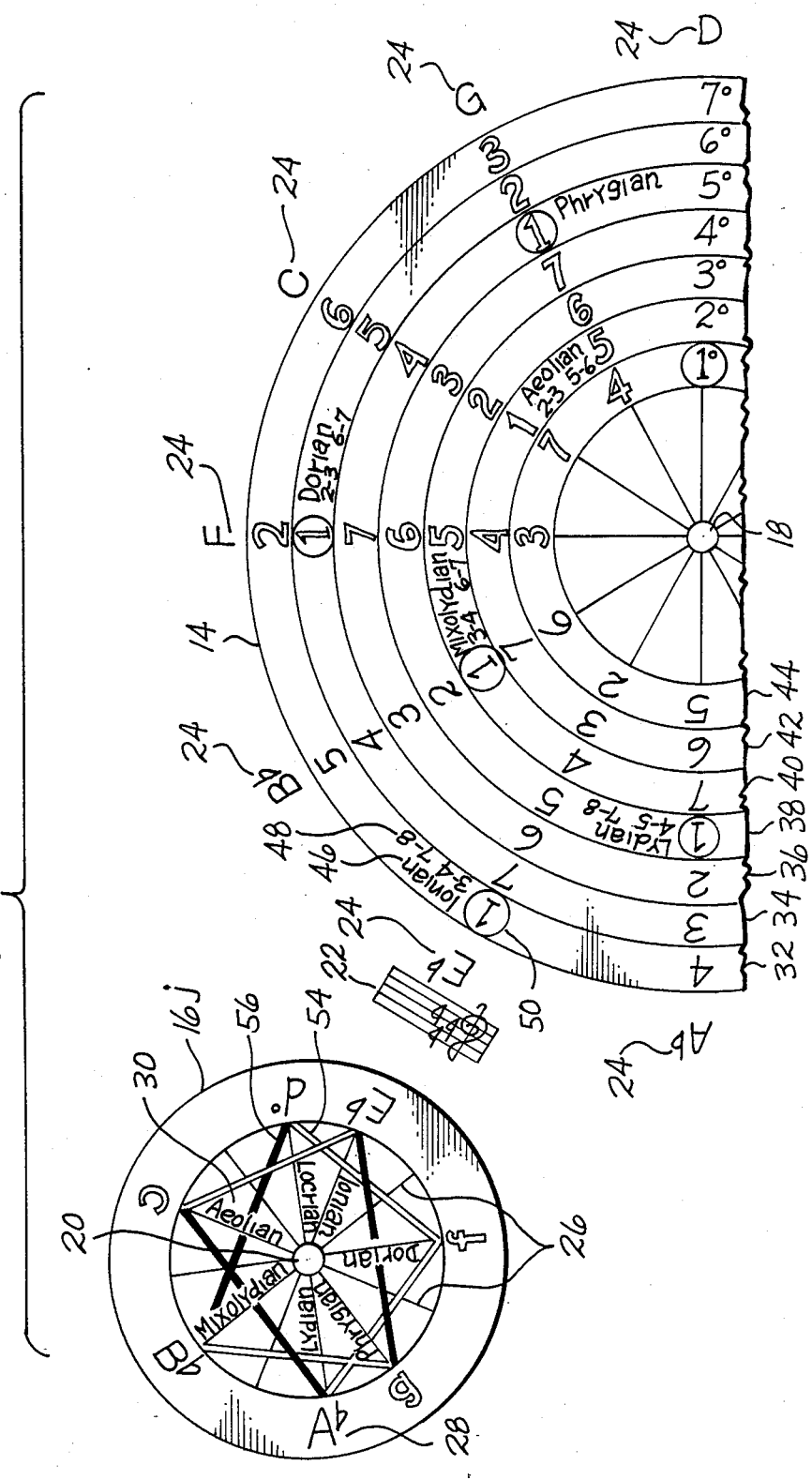
FIG. 4 is a fragmentary view showing a third example configuration of the device.

As a second example, the key of three flats (E flat reference note) may be studied in the same manner, as shown in FIG. 4. The Ionian tonic note 50 on the main wheel member 14 is aligned with the key signature 22. Observing the outermost concentric line 32, which represents the Ionian mode on the main wheel member 14, A flat is 4, E flat is 1, B flat is 5, F is 2, C is 6, G is 3, and D is 7. This information may be confirmed mentally on the secondary wheel member 16j by aligning the indicated Ionian tonic note (E flat) with the key signature and counting clockwise around the perimeter of the secondary wheel member 16j.

Figure 5:
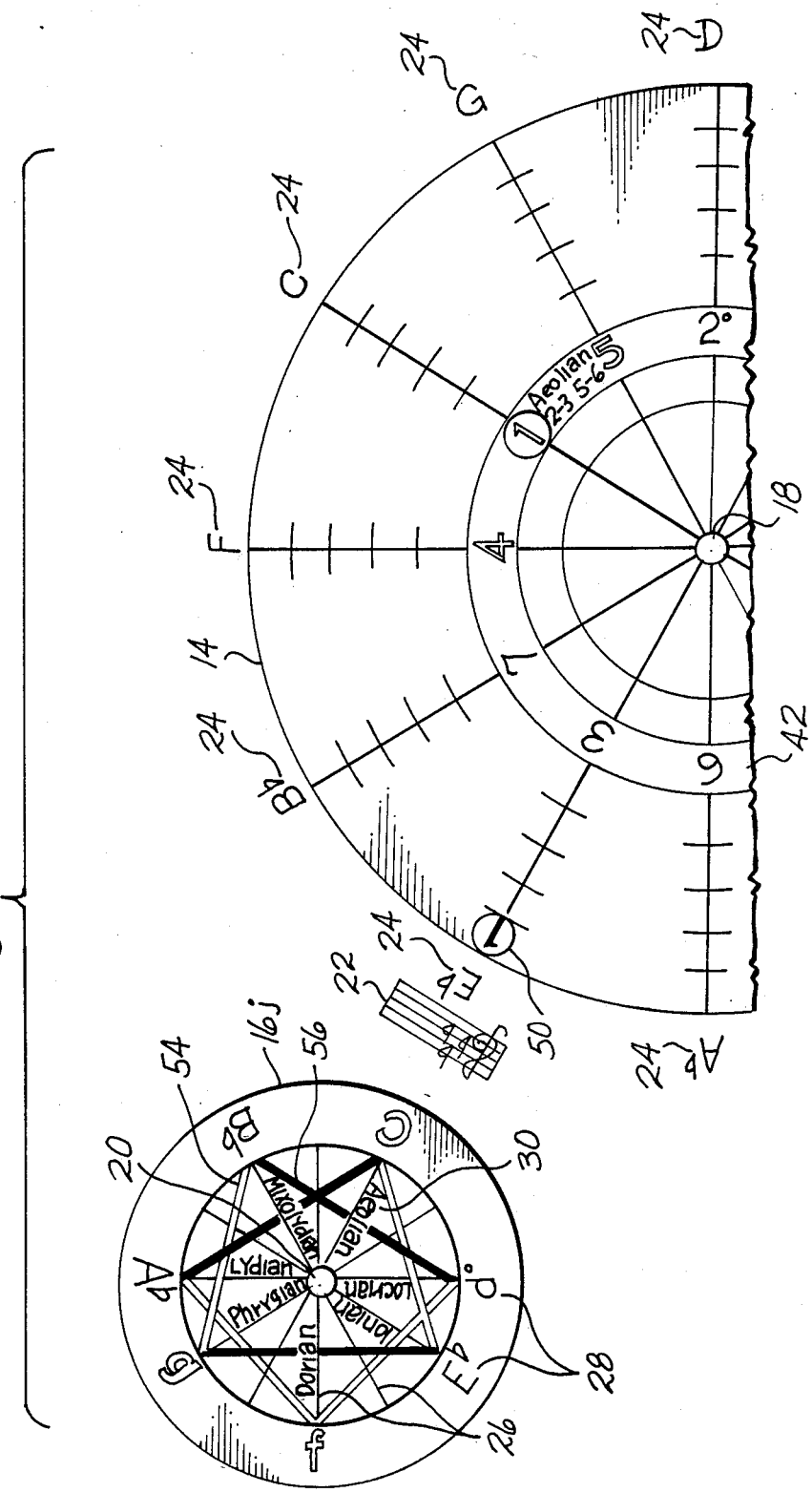
FIG. 5 is a view showing a fourth example configuration of the device.

As shown in FIG. 5, the Aeolian mode of the same key may be examined in the same manner by referring to the sixth cocentric line 42 on the main wheel member 14 and by turning the secondary wheel member 16j to align the Aeolian tonic note C with the key signature 22. Notice that the Ionian tonic note 50 remains aligned with the selected key signature 22.

Figure 6:
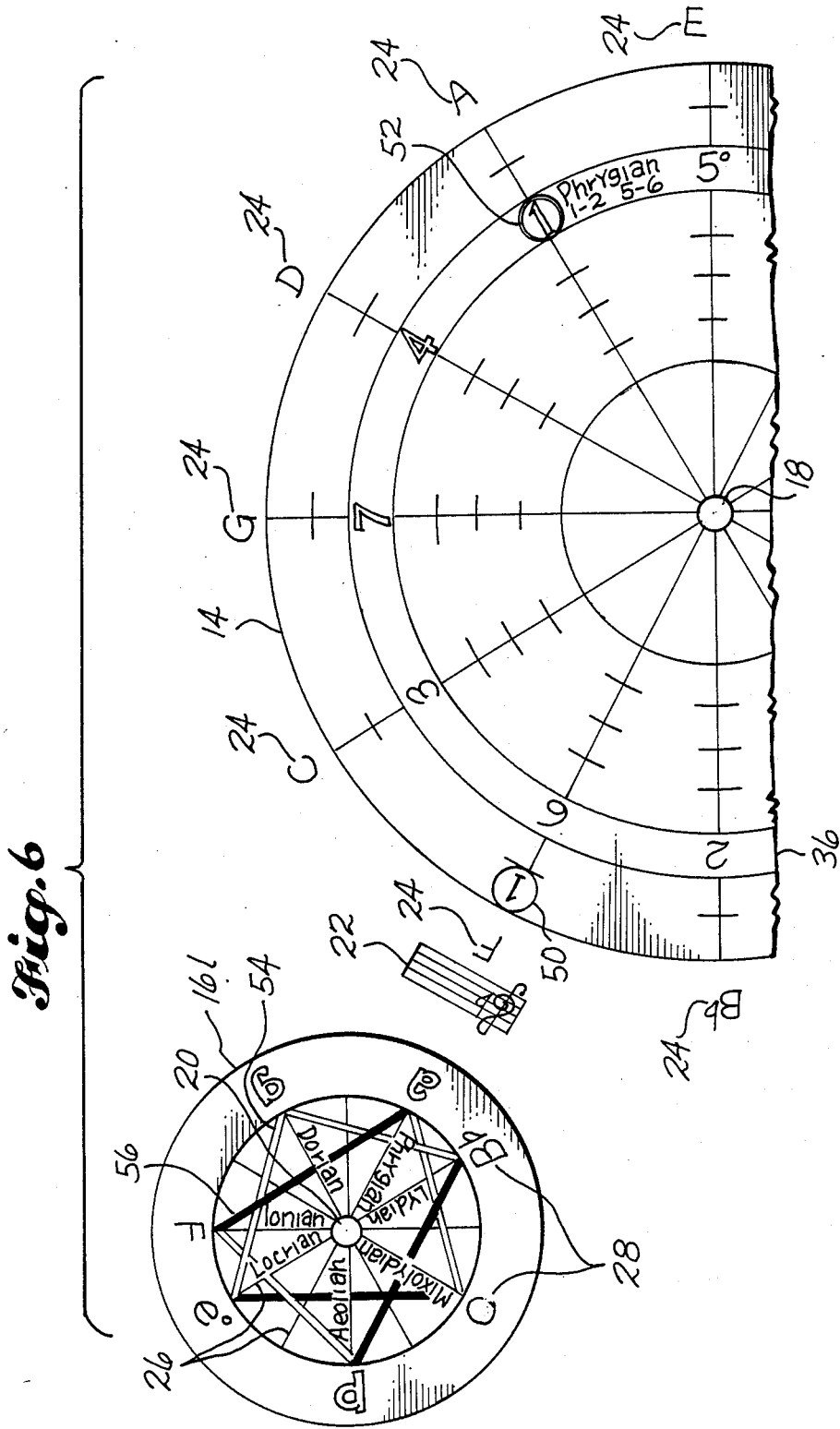
FIG. 6 is a fragmentary view showing a fifth example configuration of the device.

The above-described system may also be used in a reverse manner. To determine which notes are found in a particular mode, the main wheel member 14 may be turned to align the tonic or first note of the selected mode with a reference note 24 of the user's choice. This will clearly indicate the corresponding reference notes 24 which are found in that mode of that key and will refer the user to the secondary wheel member 16 which is aligned with the Ionian tonic note 50. For example, as shown in FIG. 6, one may wish to determine which notes create an A Phrygian mode. The main wheel member 14 is turned to align the Phrygian tonic or first note 52 located on the third concentric line 36 of the main wheel member 14 with the A reference note 24. The reference notes 24 which naturally occur in that mode of that key are readily observable. The Ionian tonic note 50 is also aligned with the appropriate key signature 22 and major scale reference note 24. In this example, it is the key of one flat (reference note F). The A Phrygian mode may be found on the associated secondary wheel member 16-1 and rotated to align with the key signature 22. The A Phrygian mode is found on the secondary wheel member 16-1 that uses the same notes as F Ionian (F major). Every mode in every key may be determined in this manner, using the Ionian tonic note 50 as the universal reference point.

Harmony may be created by combining notes at intervals of thirds. Shown on each secondary wheel member 16 are seven internal lines 54, 56 connecting every other note in the key. These lines represent two kinds of thirds. Major thirds equal two whole steps and are designated by solid black lines 56. Minor thirds equal 1½ steps and are designated with double lines 54. In preferred form, the illustrated double lines 54, which represent minor thirds, are printed in a different color, such as red. Referring to FIG. 1a, in the key of no sharps and no flats (secondary wheel member 16a), C—E, F—A, and G—B are major thirds. In the same key, D—F, E—G, A—C, and B—D are minor thirds. There are a total of seven thirds in each key (three major thirds and four minor thirds).

A triad is three-part harmony containing a root, a third and a fifth. Triads are created by playing two intervals of thirds. Major third—minor third creates a major triad, minor third—major third creates a minor triad, and minor third—minor third creates a diminished triad. A fourth kind of triad exists but does not occur naturally within a key. A major third—major third is an augmented triad and always requires an accidental.

For example, referring to FIG. 1a, in the key of no sharps and no flats (secondary wheel member 16a), observe that C (root)—E (third) is connected with a solid line (major third) and that E (third)—G (fifth) is connected with a double line (minor third). The notes in a major C triad are C—E—G The roots of all major triads in a key are designated with upper case, solid letters 28 on the secondary wheel members 16. The notes in a D triad are D (root)—F (third)—A (fifth) and can be observed by following a double line (minor third)—solid line (major third), thus creating a minor triad. The roots of all minor triads are designated by lower case, outlined letters 28 on the secondary wheel members 16. Letters representing major and minor triad roots may also be differentiated by color, such as major triad roots being black and minor triad roots being red. The notes in a B triad are B (root)—D (third)—F (fifth) and can be observed by following a double line (minor third)—double line (minor third), creating a diminished triad. The root of a diminished triad is designated by a lower case letter with a diminished insignia (°). The root of a diminished triad may also be differentiated by a separate color, such as green.

As shown on each secondary wheel member 16, every key contains seven triads: three major, three minor, and one diminished. Color coding of the triad roots provides an easy means of locating the particular triad roots of any selected key on the secondary wheel members 16. For example, referring to secondary wheel member 16a, the major triad roots in the key of no sharps and no flats are C, F, and G (upper case, solid or black letters), the minor triad roots are D minor, E minor, and A minor (lower case, outlined or red letters), and the diminished triad is B (lower case, green letter with diminished insignia (°)). All triad roots in every key may be observed in this manner.

By following inner harmony lines 54, 56 on each secondary wheel member 16 beyond the triad will lead the user to the seventh, the ninth, the eleventh, and finally the thirteenth interval. These intervals create more complex chord forms, often used in jazz.

The information on the main wheel member 14 may be used to convert the triad information on each secondary wheel member 16 into numbers. Referring to FIG. 1a, using the example key key of no sharps and no flats, the C reference note 28 on the secondary wheel member 16a and the Ionian tonic note 50 on the main wheel member 14 may be aligned with the key signature 22. Observing clockwise on the outermost concentric line 32 of the main wheel member 14, F is 4, C is 1, and G is 5. These solid or black numerals indicate that these are roots of major triads. Observe also that D is 2, A is 6, and E is 3. These outlined or red numerals indicate that the corresponding reference notes 24 are roots of minor triads. The remaining note, B, is 7°. A numeral followed by the diminished insignia (°) or printed in green indicates that the corresponding reference note 24 is the root of a diminished triad. This numerical information may be created mentally by counting on the corresponding secondary wheel member 16a: C—1 (upper case/solid/black) is major, D—2 (lower case/outlined/red) is minor, E—3 (lower case/outlined/red) is minor, F—4 (upper case/solid/black) is major, G—5 (upper case/solid/black) is major, A—6 (lower case/outlined/red) is minor, and B—7 (lower case/° /green) is diminished. That is the triad progression for the C Ionian mode.

Referring again to FIG. 3, as another example, the Dorian mode in the same key may be examined As observed in the second cocentric line 34 on the main wheel member 14, the Dorian tonic note is aligned with the D reference note 24. Observing clockwise along the line 34, F—3, C—7, and G—4 are major (solid/black), D—1, A—5, and E—2 are minor (outlined/red), and B—6 is diminished (°/green). This information may be confirmed on the secondary wheel member 16a by counting around the perimeter notes 28, beginning from D, and observing the position, case and color of each note 28. Each of the seven modal progressions in each of the twelve keys may be studied in this manner on the device 10 of the present invention.

To determine the triad progression in a particular mode, the selected modal tonic note on the main wheel member 14 may be aligned with the reference note 24 of the user's choice. The triad roots will be the seven reference notes 24 on the circle of fifths printed on the base member 12 and will correspond to the color coding on the main or "transposing" wheel member 14. The triads may also be found on the secondary wheel member 16 which is aligned with the Ionian tonic note 50. For example, referring to FIG. 6, the triad progression for A Phrygian may be determined by aligning the Phrygian tonic note 52 with the A reference note 24. Observing clockwise along the line 36, 2, 6, and 3 (B flat, F, and C) are major (solid/black numerals); 7, 4 and 1 (G, D, and A) are minor (outlined/red); and 2° (B) is diminished (°/green). To observe the triads as they appear in order, refer to the secondary wheel member 16-1 aligned with the Ionian tonic note 50 and the key signature 22 (key of one flat). Any modal progression for any key may be located in this manner.

More complex forms of music may switch from one mode to another, have more elaborate harmonies, or switch from one key signature to another. However, all forms of music use modes and corresponding chord progressions as their bases. The most commonly used modes are the Ionian and Mixolydian (major modes), and the Aeolian and Dorian (minor modes) The present invention provides a complete music teaching tool illustrating the structure of every triad or chord in every mode of every key. It is to be understood that variation may be made on the form or arrangement illustrated without departing from the spirit and scope of the invention. The illustrated and described embodiment is for example only and, therefore, is nonlimitive. The scope of my rights in this invention are to be limited only by the following claims interpreted according to patent doctrines including the doctrine of equivalents.

What is claimed is:

1. A music teaching device, comprising:
a base member having an upper surface
a main wheel member pivotally attached to the upper surface of the base member at a central location;
twelve secondary wheel members each pivotally attached to the upper surface of the base member at circumferential spaced-apart points, radially outwardly from said main wheel member;
indicia on said base member indicating major scale reference notes for each of twelve keys and being circumferentially spaced radially outwardly from said main wheel member, each reference note being associated with one of the secondary wheel members;
said main wheel member being pivotable to selectively align indicia thereon to correspond with major scale reference notes on said base member such that the diatonic order of diatonic notes of a selected key are indicated for each mode of the selected key;
indicia on each of said secondary wheel members radially dividing each said secondary wheel member into twelve equal sections, thereby representing chromatic steps of an octave, and further indicia on each of said secondary wheel members indicating the diatonic notes of a separate one of said twelve keys arranged in order at whole- and half-step intervals in association with the radial divisions; and
each said secondary wheel member being pivotable to selectively associate the tonic note of each mode of the secondary wheel member's separate key with the associated major scale reference note on the base member.

2. The device of claim 1, further comprising indicia on each of said secondary wheel members indicating major third and minor third intervals between said indicated diatonic notes.

3. The device of claim 2, wherein said major third intervals are indicated by a selected color and said minor third intervals are indicated by a separate selected color.

4. The device of claim 1, further comprising indicia on each of said secondary wheel members indicating notes which are roots of major, minor and diminished triads of the indicated one of said twelve keys.

5. The device of claim 4, wherein said major triad roots are indicated by a selected color, said minor triad roots are indicated by a second selected color, and diminished triad roots are indicated by a third selected color.

6. The device of claim 4, wherein said major triad roots are indicated by upper case letters, said minor triad roots are indicated by lower case letters, and said diminished triad roots are indicated by lower case letters and a diminished insignia (°).

7. The device of claim 6, wherein said major triad roots are indicated by a selected color, said minor triad roots are indicated by a second selected color, and said diminished triad roots are indicated by a third selected color.

8. The device of claim 1, further comprising indicia on each of said secondary wheel members indicating names of each mode, and each mode name being associated with the tonic note of that mode.

9. The device of claim 1, further comprising indicia on said main wheel member in the form of numerals arranged in cocentric lines, each line separately indicating the numerical order of said corresponding major scale reference notes for a mode of the selected key.

10. The device of claim 9, wherein the tonic note of each mode is indicated.

11. The device of claim 9, wherein roots of major, minor and diminished triads for each mode of a selected key are separately indicated.

12. The device of claim 11, wherein wherein said major triad roots are indicated by a selected color, said minor triad roots are indicated by a second selected color, and said diminished triad roots are indicated by a third selected color.

13. The device of claim 1, further comprising indicia on said base member indicating key signatures associated with each of said major scale reference notes.

14. The device of claim 13, including fifteen key signatures and fifteen major scale reference notes for twelve keys such that three enharmonic keys include overlapping key signatures and major scale reference notes.

15. The device of claim 13, wherein said key signatures and major scale reference notes are arranged in order of intervals of ascending major fifths and descending major fourths beginning from the key of no sharps and no flats (major scale reference note C).

16. The device of claim 15, including fifteen key signatures and fifteen major scale reference notes associated with the twelve keys such that enharmonic keys overlap.

17. The device of claim 16, wherein said enharmonic keys comprise the key of five sharps (B) and the key of seven flats (C flat), the key of six sharps (F sharp) and the key of six flats (G flat), and the key of seven sharps (C sharp) and the key of five flats (D flat).

* * * * *

UNITED STATES PATENT AND TRADEMARK OFFICE
CERTIFICATE OF CORRECTION

PATENT NO. : 4,887,507

DATED : December 19, 1989

INVENTOR(S) : Terrance Shaw

It is certified that error appears in the above-identified patent and that said Letters Patent is hereby corrected as shown below:

Col. 2, line 38, after "is a", insert -- fragmentary --.

Col. 4, line 22, "viualize" should be -- visualized --.

Col. 4, line 27, "The numerical" should begin a new paragraph.

Col. 4, line 31, after "mode", insert a period.

Col. 4, line 41, "-A" should be -- 6-A --.

Col. 7, line 15, after "examined", insert a period.

Signed and Sealed this

Tenth Day of September, 1991

Attest:

HARRY F. MANBECK, JR.

*Attesting Officer*   *Commissioner of Patents and Trademarks*